(12) United States Patent
Gupta et al.

(10) Patent No.: US 11,675,735 B1
(45) Date of Patent: Jun. 13, 2023

(54) FILE TRANSFER PRIORITIZATION DURING REPLICATION

(71) Applicant: Dell Products, L.P., Round Rock, TX (US)

(72) Inventors: Kaushik Gupta, Pune (IN); Shiv S. Kumar, Pune (IN); Jai P. Gahlot, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 24 days.

(21) Appl. No.: 17/538,445

(22) Filed: Nov. 30, 2021

(51) Int. Cl.
*G06F 16/00* (2019.01)
*G06F 16/11* (2019.01)
*G06F 16/27* (2019.01)
*G06F 16/182* (2019.01)

(52) U.S. Cl.
CPC ............ *G06F 16/119* (2019.01); *G06F 16/27* (2019.01); *G06F 16/1844* (2019.01)

(58) Field of Classification Search
CPC ..... G06F 16/119; G06F 16/1844; G06F 16/27
See application file for complete search history.

(56) References Cited

U.S. PATENT DOCUMENTS

| | | | | |
|---|---|---|---|---|
| 2007/0185852 | A1* | 8/2007 | Erofeev | G06F 16/184 |
| 2013/0124464 | A1* | 5/2013 | Rank | G06F 16/27 |
| | | | | 707/610 |
| 2020/0349074 | A1* | 11/2020 | Kucherov | G06F 3/0619 |
| 2021/0181945 | A1* | 6/2021 | Kumar | G06F 11/3466 |
| 2021/0326358 | A1* | 10/2021 | Seelemann, II | G06F 16/24542 |
| 2022/0129152 | A1* | 4/2022 | Adams | G06F 3/061 |

OTHER PUBLICATIONS

Gupta et al. "File Transfer Prioritization During Replication" U.S. Appl. No. 17/538,340, filed Nov. 30, 2021, 43 pages.
Gupta et al. "File Transfer Prioritization During Replication" U.S. Appl. No. 17/538,486, filed Nov. 30, 2021, 45 pages.

* cited by examiner

*Primary Examiner* — Diedra McQuitery
(74) *Attorney, Agent, or Firm* — Amin, Turocy & Watson, LLP

(57) ABSTRACT

A system can determine to perform a replication of data from first computing equipment to second computing equipment, wherein the data is stored within a path in a file system of the first computing equipment. The system can determine the path from a replication policy for the replication. The system can, while tree-walking the path, in response to determining that a first file is marked for priority replication, adding the first file to a priority queue, and in response to determining that a second file lacks a marking for priority replication, adding the second file to a normal queue. The system can, in response to determine that the priority queue contains files, replicating the files from the priority queue instead of replicating other files from the normal queue.

20 Claims, 12 Drawing Sheets

```
200

┌─────────────────────────────────────────┐
        │  FILE TRANSFER PRIORITIZATION DURING    │
        │      REPLICATION COMPONENT 212          │
        └─────────────────────────────────────────┘

202
┌──────────────────────────────────────────────────────┐
│ /SYSTEM/ ...                                         │
│ /USR/                                                │
│      ASMITH/              206                        │
│      JDOE/                                           │
│ 204      IN_PROGRESS/                                │
│              ...       208                           │
│              SENSITIVE/        210                   │
│                  DIR1/                               │
│                      FILEA                           │
│                      FILEB                           │
│                      ...                             │
│                  DIR2/                               │
│                      FILEC                           │
│                      FILED                           │
│                      ...                             │
│                  ...                                 │
│              SPECIAL/                                │
│                  DIR3/                               │
│                      FILEE                           │
│                      FILEF                           │
│                      ...                             │
│                  DIR4/                               │
│                      FILEG                           │
│                      FILEH                           │
│                      ...                             │
│                  ...                                 │
│              ...                                     │
│      ...                                             │
└──────────────────────────────────────────────────────┘
```

```
ATTRIBUTE A: VALUE A 302
ATTRIBUTE B: VALUE B 304
ATTRIBUTE C: VALUE C 306
REPLICATION PRIORITY: HIGH 308
```

DETERMINING TO PERFORM A REPLICATION OF DATA FROM FIRST COMPUTING EQUIPMENT TO SECOND COMPUTING EQUIPMENT, WHEREIN THE DATA IS STORED WITHIN A PATH IN A FILE SYSTEM OF THE FIRST COMPUTING EQUIPMENT 904

DETERMINING THE PATH FROM A REPLICATION POLICY FOR THE REPLICATION 906

WHILE TREE-WALKING THE PATH,
IN RESPONSE TO DETERMINING THAT A FIRST FILE IS MARKED FOR PRIORITY REPLICATION, ADDING THE FIRST FILE TO A PRIORITY QUEUE, AND
IN RESPONSE TO DETERMINING THAT A SECOND FILE LACKS A MARKING FOR PRIORITY REPLICATION, ADDING THE SECOND FILE TO A NORMAL QUEUE 908

IN RESPONSE TO DETERMINING THAT THE PRIORITY QUEUE CONTAINS FILES, REPLICATING THE FILES FROM THE PRIORITY QUEUE INSTEAD OF REPLICATING OTHER FILES FROM THE NORMAL QUEUE 910

DETERMINING, FROM A REPLICATION POLICY FOR A REPLICATION FROM A FIRST COMPUTER TO A SECOND COMPUTER, A PATH OF A FILE SYSTEM OF THE FIRST COMPUTER TO REPLICATE 1104

↓

WHILE ANALYZING FILES IN THE PATH,
IN RESPONSE TO DETERMINING THAT A FIRST FILE IS MARKED FOR PRIORITY REPLICATION, ADDING THE FIRST FILE TO A PRIORITY QUEUE, AND
IN RESPONSE TO DETERMINING THAT A SECOND FILE LACKS A MARKING FOR PRIORITY REPLICATION, ADDING THE SECOND FILE TO A NORMAL QUEUE 1106

↓

BASED ON THE PRIORITY QUEUE COMPRISING FILES, REPLICATING THE FILES FROM THE PRIORITY QUEUE PRIOR TO REPLICATING ANY FILES FROM THE NORMAL QUEUE 1108

FILE TRANSFER PRIORITIZATION DURING REPLICATION

BACKGROUND

Data replication can comprise a form of data protection where data from a source computer is duplicated to a destination computer.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine to perform a replication of data from first computing equipment to second computing equipment, wherein the data is stored within a path in a file system of the first computing equipment. The system can determine the path from a replication policy for the replication. The system can, while tree-walking the path, in response to determining that a first file is marked for priority replication, adding the first file to a priority queue, and in response to determining that a second file lacks a marking for priority replication, adding the second file to a normal queue. The system can, in response to determine that the priority queue contains files, replicating the files from the priority queue instead of replicating other files from the normal queue.

An example method can comprise determining, by a system comprising a processor, and from a replication policy for a replication from a first device to a second device, a path of a file system of the first device to replicate. The method can further comprise, concurrently with tree-walking the path, in response to determining that a first file is marked for priority replication, adding, by the system, the first file to a priority queue, and in response to determining that a second file lacks a marking for priority replication, adding, by the system, the second file to a normal queue. The method can further comprise, when the priority queue contains files, replicating, by the system, the files from the priority queue instead of replicating other files from the normal queue.

An example non-transitory computer-readable medium can comprise instructions that, in response to execution, cause a system comprising a processor to perform operations. These operations can comprise determining, from a replication policy for a replication from a first computer to a second computer, a path of a file system of the first computer to replicate. These operations can further comprise while analyzing files in the path, in response to determining that a first file is marked for priority replication, adding the first file to a priority queue, and in response to determining that a second file lacks a marking for priority replication, adding the second file to a normal queue. These operations can further comprise, based on the priority queue comprising files, replicating the files from the priority queue prior to replicating any files from the normal queue.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates an example system architecture for tree walking a file system that can facilitate file transfer prioritization during replication, in accordance with an embodiment of this disclosure;

FIG. 3 illustrates an example system architecture for an extended attribute that can facilitate file transfer prioritization during replication, in accordance with an embodiment of this disclosure;

FIG. 9 illustrates an example process flow that can facilitate file transfer prioritization during replication, in accordance with an embodiment of this disclosure;

FIG. 11 illustrates another example process flow that can facilitate file transfer prioritization during replication, in accordance with an embodiment of this disclosure;

DETAILED DESCRIPTION

Overview

Figure 1:
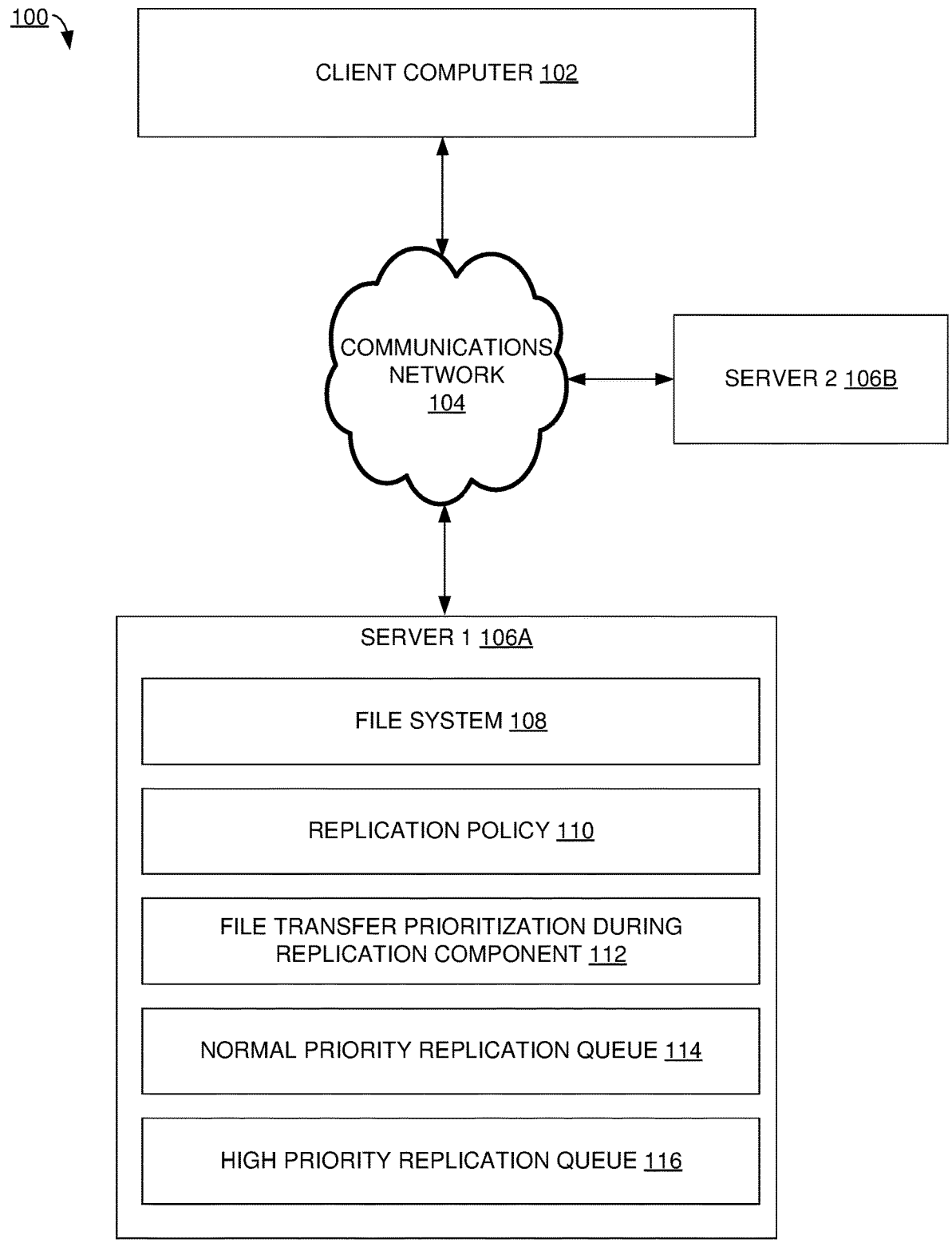
FIG. 1 illustrates an example system architecture that can facilitate file transfer prioritization during replication, in accordance with an embodiment of this disclosure.

Storage, such as network attached storage (NAS), can provide a replication facility for disaster recovery. In some examples, a replication recurring job can be defined to protect data involved in one or more Recovery Point Objectives (RPOs) in a disaster recovery plan.

There can be multiple files to migrate in a replication job execution. Different users can edit these files between two subsequent job runs of one replication policy. The users that edit a file can change over time. Different users can be assigned different levels of criticality as far as meeting RPOs. Additionally, different applications with varied criticality can write files to these storage systems.

In some examples, a general queue of files can be maintained while transferring a file from a source to target storage. This queue can be populated as a replication job traverses through a directory structure under replication. Another thread can keep reading file information from the queue and start replication tasks.

In some prior approaches, while populating the queue, a file priority based on user criticality is not considered. This can mean that a file written by a critical user can be replicated to the target at the end of a replication job.

The examples described herein generally involve the use of queues (e.g., a priority queue and a normal queue). It can be appreciated that a queue can generally be implemented in a variety of ways, such as with a variety of data structures (e.g., a linked list data structure, or a circular buffer data structure). A queue can generally order elements such that those elements can be retrieved (or transferred) in that order.

In some examples, a list of files to transfer for replication can be maintained, along with a respective priority for each file. Files can be accessed from the list by querying a component that maintains the list for, e.g., a file with a highest priority among those files presently in the list. In other examples, the querying entity can specify a priority being requested, and that entity can request files with the highest priority until no more are present, then files with the next highest priority until no more are present, etc.

In some examples, a queue does not strictly order the files being replicated. Rather, the queue can order files based on their priority, and within a particular priority (e.g., high priority), files are not ordered. That is, it can be that higher priority files are transferred before lower priority files, but that there is not a specific order of transferring files within a specific priority level.

In examples of a normal queue and a priority queue as used herein, adding a file to a normal queue can comprise adding a file for replication with normal priority, and adding a file to a priority queue can comprise adding a file for replication with high priority. It can be that one queue is used to store both normal files and priority files, and, e.g., a query is made to a component that maintains the queue to provide a file, where a priority file is provided when one is present.

There can be scenarios where a partial replication (e.g., a few files are replicated out of identified files for replication) can be implemented. For example, this can be implemented in a home directory workflow, where an administrator wants to replicate home directory files across different users.

There can be a possibility that during a replication job, a source storage system can be hit by a disaster, and only a few of the identified files for replication will be successfully transferred to the target storage system. In this situation, where a priority of files is not maintained during replication, then it can be that more critical files can have less protection.

The present techniques can be implemented to maintain a priority of files during replication based on a criticality of an associated user or application.

An approach to prioritizing a sub-path or file can involve directly prioritizing a sub-path or file in an ad hoc manner. While traversing a protected path, a customer can mark a sub-path or file as a priority. This information can be added to extended attributes of the sub-path or file.

The customer while traversing the protected path could mark a sub-path or a file as priority. This information will be added to the extended attributes of the file or the sub-path.

In this example, it can be that a copy-job is not aware of priority sub-paths or files when a job begins. As the copy-job starts a tree-walk, it can encounter sub-paths or files that are marked as priority. A file or sub-path marked as priority can be added to a priority queue. File transfer threads can serve priority queue elements before normal queue elements.

In some examples, this approach does not guarantee that priority files are transferred first. However, once priority files are found, they can be transferred as soon as possible.

The extended attribute of a file can be used to identify if it is a priority file. The extended attribute can be set by a protocol driver (or a filter) if the file is being used by a priority user. In some examples, a file can be specified as a priority file where a user account specifies it as priority (e.g., marking the file as priority in an ad hoc manner while browsing through a file system hierarchy). In some examples, a file can be specified as a priority file where a priority user account accesses or updates the file (e.g., the file is marked by a protocol filter driver when the user accesses or updates the file).

Some replications can be performed on a snapshot with metadata about the snapshot (e.g., creation and expiry time, expiry action, subsets, state, etc.). Additional information about a replication can involve when to create a dataset (e.g., a creation policy that accepts a schedule and a source account ID), when to replicate the dataset and the source and destination (e.g., a copy policy that accepts a schedule and source and target account IDs), and identifying source and target computers (e.g., account details that accept a Uniform Resource Identifier (URI) or Internet Protocol (IP) address for accessing each computer). This information can be stored in a key-value store (KVS).

A scheduler can keep track of a current time and when to execute a next replication policy. When it is time for a policy to run, a job corresponding to the policy can be created.

In examples that implement replication on a computing cluster that comprises a plurality of nodes, replication can be implemented as follows. One node can serve as a scheduler. Where the node serving as the scheduler goes down, other nodes can race to become the scheduler. Each node on a cluster can have a job-runner. A job created by the scheduler can be picked up by any job-runner, which can create a first task for the job (which can be referred to as a root-task), and monitor the job until the job comes to an end.

Each node on a cluster can have a task-runner, and tasks for any job can be picked up by any task-runner.

Tasks can be created on a KVS (with indexing, which can be referred to as a key-value index (KVI)). This indexing can help a task-runner to fetch tasks based on state and priority. A task-runner can query for tasks with pending state and high priority. If there are no high priority tasks, the task-runner can then query for tasks with pending state and medium priority (and then pending state and low priority).

Every node on the cluster has a task-runner. The tasks for any job could be picked by any task-runner.

In some prior approaches, the priority for every task for one job is the same as the priority of the job.

The present techniques can be implemented to better prioritize tasks. Using the high/medium/low priority framework, a new priority—highest—can be implemented. In such examples, even if a job has a high priority (meaning that its tasks also have a high priority), there can be highest priority tasks that are prioritized above high priority tasks.

Example Architectures

FIG. 1 illustrates an example system architecture 100 that can facilitate file transfer prioritization during replication, in accordance with an embodiment of this disclosure.

System architecture 100 comprises client computer 102, communications network 104, server 1 106A, and server 2 106B. In turn, server 1 106A comprises file system 108, replication policy 110, file transfer prioritization during replication component 112, normal priority replication queue 114, and high priority replication queue 116.

Client computer 102 can access files stored in file system 108, via communications network 104. As the data in file system 108 is modified, it can be periodically replicated to server 2 106B to provide data protection. Replication can be managed by file transfer prioritization during replication component 112, which can follow the replication parameters defined by replication policy 110, and use both normal priority replication queue 114 and high priority replication queue 116 as a queue of files to be transferred in a current instance of a replication.

Replication policy 110 can store information about a replication, such as a protected path, a priority of the replication policy, a frequency with which to perform the replication, a source system (e.g., server 1 106A) and a destination system (e.g., server 2 106B). File system 108 can be similar to system architecture 200 of FIG. 2. Files in file system 108 can have corresponding extended attributes stored in file system 108, and these extended attributes can be similar to system architecture 300 of FIG. 3.

Normal priority replication queue 114 and high priority replication queue 116 each can comprise an ordered queue so that an order in which files to transfer are inserted indicates an order in which those files will be replicated during the current instance of replication. In other examples, normal priority replication queue 114 and high priority replication queue 116 each can comprise a data structure that keeps track of files to replicate and their associated priorities. A component that transfers files to the target computer can access high priority replication queue 116 for a file that has a highest priority among files presently in high priority replication queue 116, and in that manner, order a transfer of files according to their priority.

Where high priority replication queue 116 is empty, the component can then attempt to access a file from normal priority replication queue 114 in a similar manner as accessing a file from high priority replication queue 116. Where high priority replication queue 116 was empty (so transfers are made from normal priority replication queue 114) but now high priority replication queue 116 has a new entry, the component can return to transferring files from high priority replication queue 116 rather than from normal priority replication queue 114.

Figure 12:
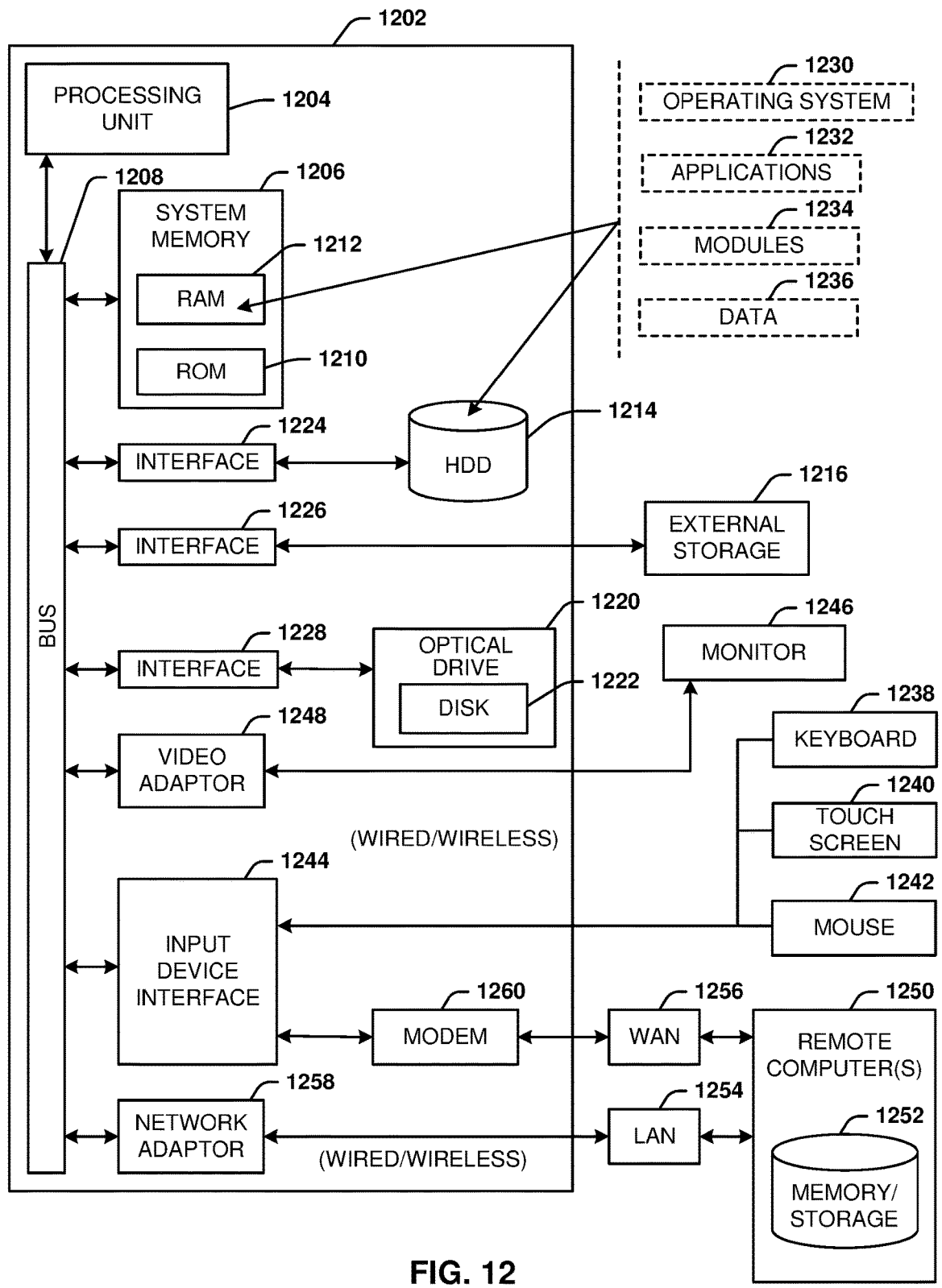
FIG. 12 illustrates an example block diagram of a computer operable to execute an embodiment of this disclosure.

Each of client computer 102, server 1 106A, and/or server 2 106B can be implemented with part(s) of computing environment 1200 of FIG. 12. Communications network 104 can comprise a computer communications network, such as the INTERNET.

Figure 10:
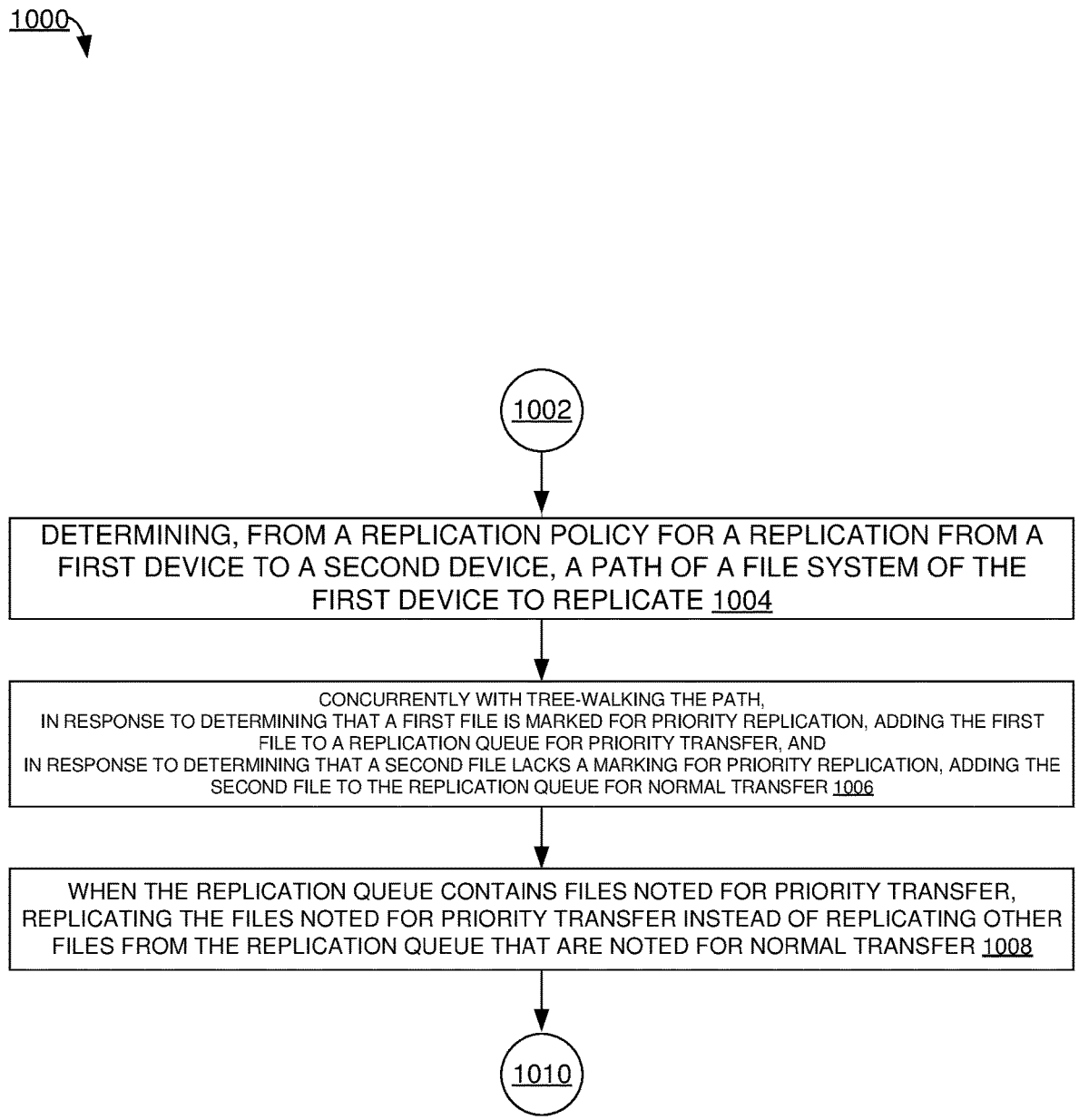
FIG. 10 illustrates another example process flow that can facilitate file transfer prioritization during replication, in accordance with an embodiment of this disclosure.

In some examples, file transfer prioritization during replication component 112 can implement part(s) of the process flows of FIGS. 9-11 to facilitate file transfer prioritization during replication.

It can be appreciated that system architecture 100 is one example system architecture for file transfer prioritization during replication, and that there can be other system architectures that facilitate file transfer prioritization during replication.

FIG. 2 illustrates an example system architecture 200 for a file system that can facilitate file transfer prioritization during replication, in accordance with an embodiment of this disclosure. System architecture comprises file system 202 (which can be similar to file system 108 of FIG. 1), and file transfer prioritization during replication component 212 (which can be similar to file transfer prioritization during replication component 112).

File system 202 comprises a hierarchical file system of folders (e.g., /system/ and /usr/) and files (e.g., fileA and fileB). Layer 1 204 of file system 204 identifies specific user folders—/usr/asmith/ and /usr/jdoe/). Layer 2 206 is a sub-layer of layer 1 204, and illustrates folders contained within /usr/jdoe. Layer 3 208 is a sub-layer of layer 2 206, and illustrates folders contained within /usr/jdoe/sensitive. Layer 4 210 is a sub-layer of layer 3 208, and illustrates files contained within /usr/jdoe/sensitive/dir1.

Tree-walking file system 202 can comprise traversing file system 202, and navigating from layer 1 toward layer 4 for each layer for a particular replication path (e.g., navigating the folders and files within /usr/asmith, the folders and files within /usr/jdoe, etc.).

In some examples, in a tree walk, a root-task can perform a directory-level walk for a first directory in a path. For each file in the directory, a file-transfer-task can be created, and for each sub-directory, a dir-transfer-task can be created. File-transfer-tasks can transfer the files and end. Dir-transfer-tasks can perform a walk-through in the assigned sub-directory and create more file-transfer-tasks and dir-transfer-tasks. With this approach, dir-transfer-tasks can create more tasks until there are no more sub-directories to analyze.

Take an example file system where the root directory of a replication path contains, directory dir-home, directory dir-data, file file-a, and file file-b. A root task can first create two dir-transfer-tasks—one for dir-home ("T1") and one for dir-data ("T2"). The root task can also create two file-transfer-tasks—one for file-a and one for file-b.

Where dir-home contains directory dir-subdir, file file-x, and file file-y, T1 can create a dir-transfer-task for dir-subdir, and file-transfer-tasks for each of file-x and file-y. Where dir-data contains file file-p and file file-q, T2 can create file-transfer-tasks for file-p and file-q (and no dir-transfer-tasks because dir-data lacks a sub-directory).

FIG. 3 illustrates an example system architecture 300 for an extended attribute that can facilitate file transfer prioritization during replication, in accordance with an embodiment of this disclosure. System architecture 300 can be used for an extended attribute, such as stored in file system 108 of FIG. 1, and used to contain information on priority files for replication.

System architecture 300 comprises attribute A: value A 302, attribute B: value B 304, attribute C: value C 306, and replication priority: high 308. Extended attributes can be stored as key:value pairs, such as "attribute A" specifying a key, and "value A" specifying a corresponding value for that pair. A file can have multiple extended attributes set for it.

As depicted, replication priority: high 308 specifies that, for the corresponding file, its replication priority is high. So, when file transfer prioritization during replication component 112 of FIG. 1 encounters a file in file system 108, with this extended attribute, file transfer prioritization during replication component 112 of FIG. 1 can set this file to be transferred in priority replication queue 116 (as opposed to normal replication queue 114).

Figure 4:
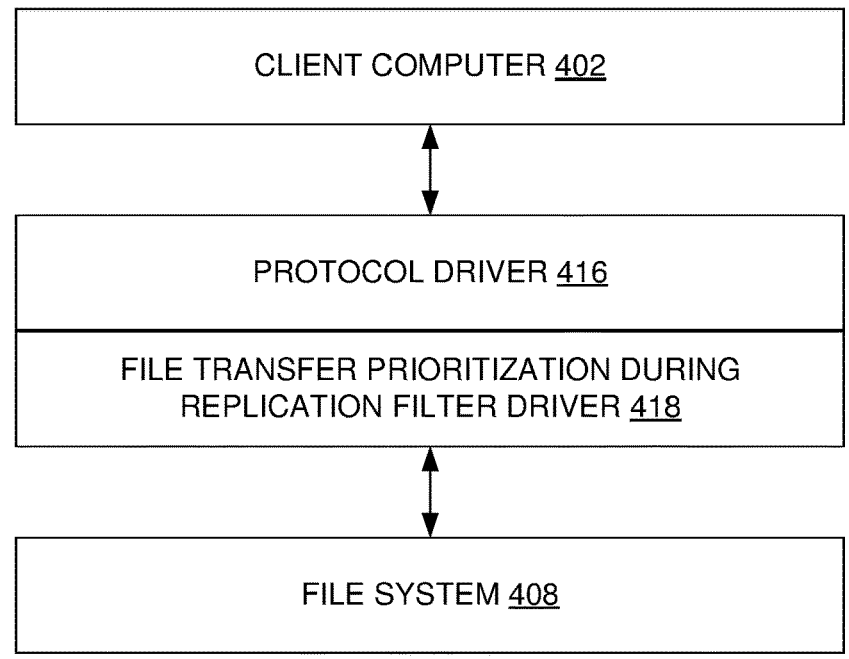
FIG. 4 illustrates an example system architecture for a protocol driver that can facilitate file transfer prioritization during replication, in accordance with an embodiment of this disclosure.

FIG. 4 illustrates an example system architecture 400 for a protocol driver that can facilitate file transfer prioritization during replication, in accordance with an embodiment of this disclosure. System architecture 400 can be implemented to monitor user actions on files, and set files to have a high replication priority when accessed by a priority user.

As depicted, system architecture 400 comprises client computer 402 (which can be similar to client computer 102 of FIG. 1), file system 408 (which can be similar to file system 108), protocol driver 416, and file transfer prioritization during replication filter driver 418.

Protocol driver 416 can operate on server 1 106A of FIG. 1, and can comprise a file system driver that receives commands from client computer 402 according to a particular protocol (e.g., a server message block (SMB) protocol, or a network file system (NFS) protocol) and executes those commands on file system 408. A command can be, for example, to create a file, read a file, or write to a file.

File transfer prioritization during replication filter driver 418 can monitor file system operations executed by protocol driver 416. File transfer prioritization during replication filter driver 418 can maintain a list of priority users. When a priority user accesses a file, file transfer prioritization during replication filter driver 418 can determine this from the monitored file system operations, and write a corresponding extended attribute that the file is to be replicated with high priority.

Where files have extended attributes marked for high priority replication as a result of system architecture 400, file transfer prioritization during replication component 112 of FIG. 1 can use these extended attributes to facilitate file transfer prioritization during replication.

While system architecture 400 comprises a protocol driver and a filter driver, it can be appreciated that there can be other examples that mark files for high priority replication due to being accessed by a priority user. For example, there can be system architectures where this function is performed by a protocol driver, without the intervention of a filter driver.

Figure 5:
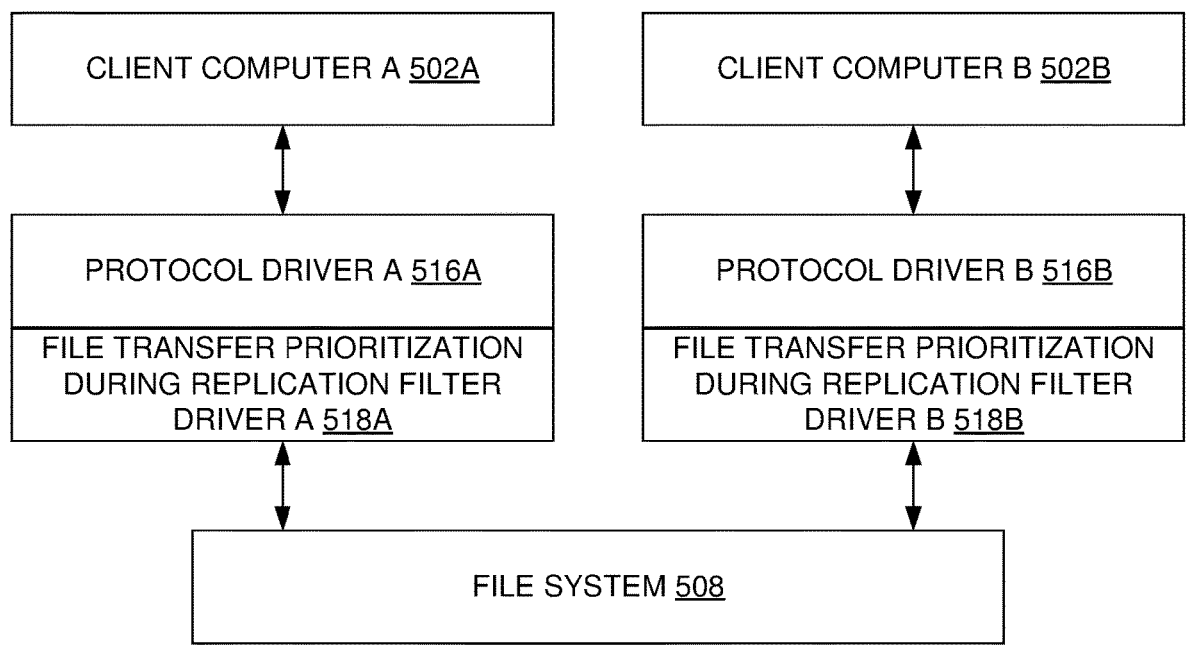
FIG. 5 illustrates an example system architecture for multiple protocol drivers that can facilitate file transfer prioritization during replication, in accordance with an embodiment of this disclosure.

FIG. 5 illustrates an example system architecture 500 for multiple protocol drivers that can facilitate file transfer prioritization during replication, in accordance with an embodiment of this disclosure. System architecture 500 can be similar to system architecture 400 of FIG. 4, where multiple protocol drivers are involved in contrast to the one protocol driver of system architecture 400.

As depicted, system architecture 500 comprises client computer 502A (which can be similar to an instance of client computer 102 of FIG. 1), client computer 502B (which can be similar to another instance of client computer 102), file system 508 (which can be similar to file system 108), protocol driver 516A and protocol driver 516B (which can each be similar to an instance of protocol driver 416 of FIG. 4), and file transfer prioritization during replication filter driver 518A and file transfer prioritization during replication filter driver 518B (which can each be similar to an instance of file transfer prioritization during replication filter driver 418).

Protocol driver A 516A and protocol driver B 516B can each implement a different protocol. For example, protocol driver A 516A can implement a SMB protocol, and protocol driver B 516B can implement a NFS protocol. In this example, client computer A 502A communicates (e.g., with server 1 106A of FIG. 1) according to a SMB protocol that is processed by protocol driver A 516A, and client computer B 502B communicates according to a NFS protocol that is processed by protocol driver B 516B.

In identifying file operations by priority users, a separate filter driver can be implemented for each protocol driver. Each of file transfer prioritization during replication filter driver 518A and file transfer prioritization during replication filter driver 518B can identify file operations by priority users, and set corresponding extended attributes for priority replication.

Where files have extended attributes marked for high priority replication as a result of system architecture 500, file transfer prioritization during replication component 112 of FIG. 1 can use these extended attributes to facilitate file transfer prioritization during replication.

Figure 6:
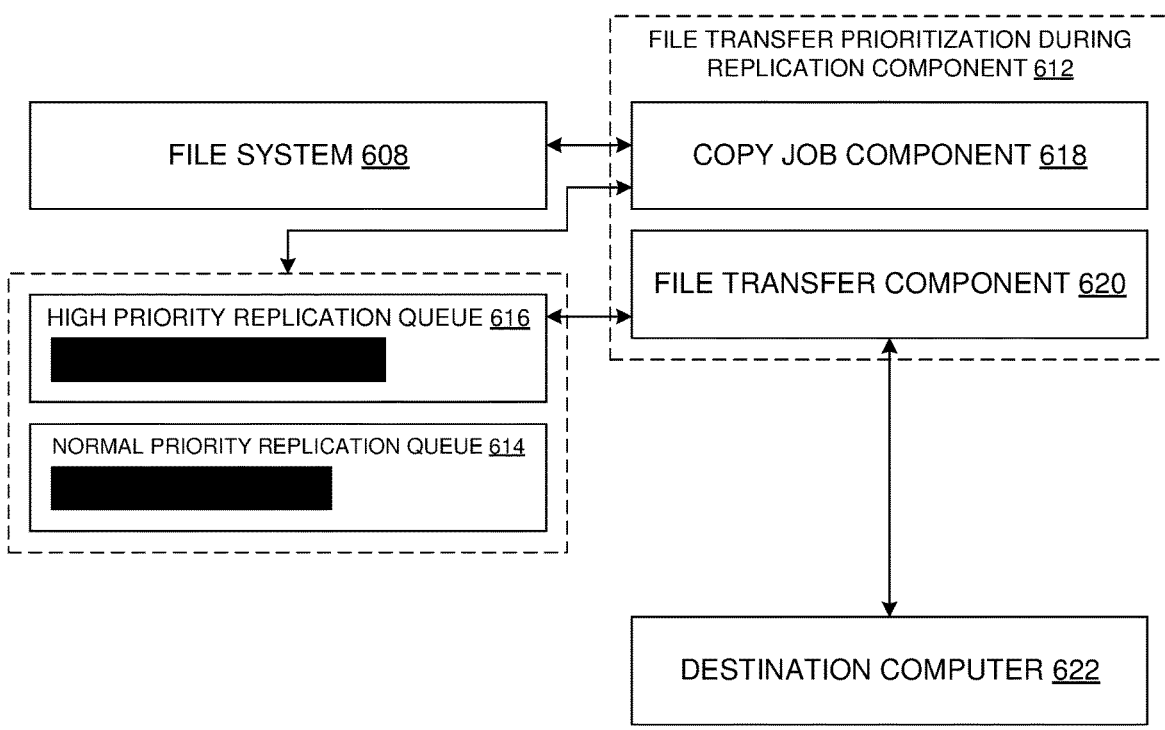
FIG. 6 illustrates an example system architecture for utilizing multiple queues that can facilitate file transfer prioritization during replication, in accordance with an embodiment of this disclosure.

FIG. 6 illustrates an example system architecture 600 for utilizing multiple queues that can facilitate file transfer prioritization during replication, in accordance with an embodiment of this disclosure.

System architecture comprises file system 608 (which can be similar to file system 108 of FIG. 1), file transfer prioritization during replication component 612 (which can be similar to file transfer prioritization during replication component 112), normal priority replication queue 614 (which can be similar to normal priority replication queue 114), high priority replication queue 616 (which can be similar to high priority replication queue 116), and destination computer 622 (which can be similar to server 2 106B). In turn, file transfer prioritization during replication component 612 comprises copy job component 618 and file transfer component 620.

As depicted, both normal priority replication queue 614 and high priority replication queue 616 contain files to transfer.

Copy job component 618 can read a replication policy and execute corresponding replications. Copy job component 618 can read one or more replication path in file system 608. Where copy job component 618 encounters a file in file system 608, copy job component 618 can read an extended attribute for that file (e.g., similar to system architecture 300 of FIG. 3) that indicates whether that file is to be replicated with a normal priority or a high priority. Copy job component 618 can insert the file into the corresponding queue—normal priority replication queue 614 or high priority replication queue 616—based on the replication priority of the file.

File transfer component 620 can transfer files from normal priority replication queue 614 and high priority replication queue 616 to destination computer 622. File transfer component 620 can first check high priority replication queue 616. Where there is a file in high priority replication queue 616, file transfer component 620 can transfer that file to destination computer 622.

Where there are files in both normal priority replication queue 614 and high priority replication queue 616, file transfer component 620 can prioritize high priority replication queue 616 and transfer files only from high priority replication queue 616.

Figure 7:
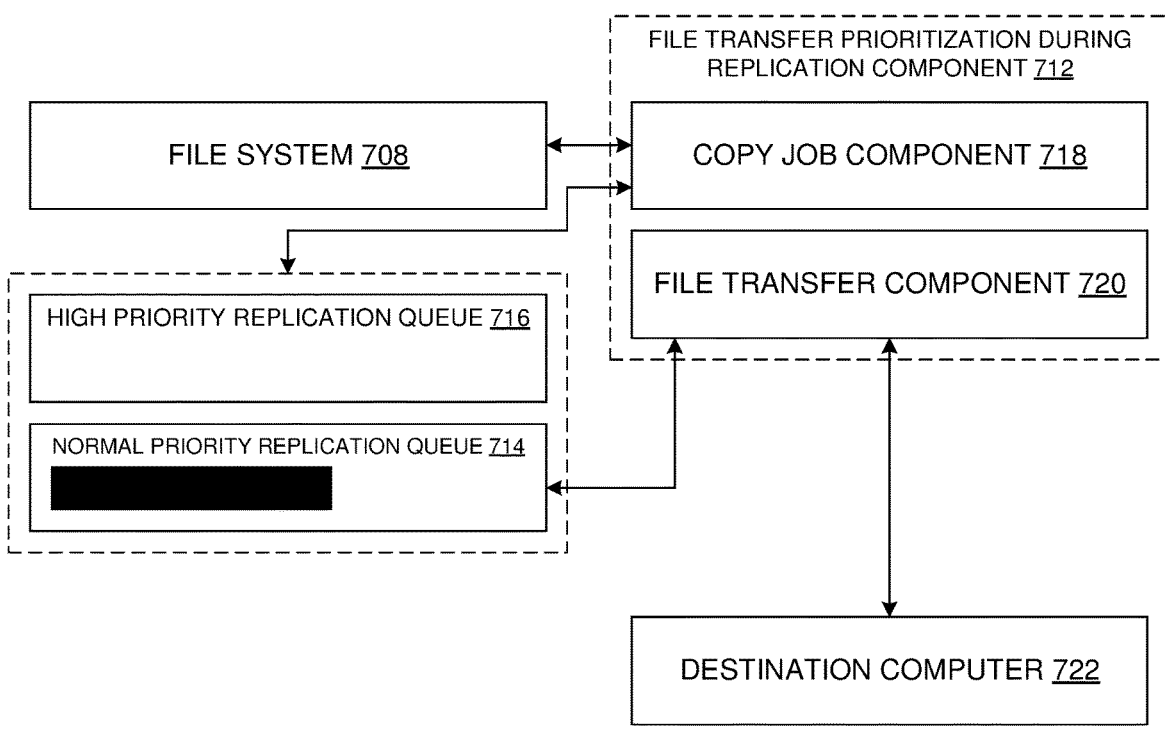
FIG. 7 illustrates another example system architecture for utilizing multiple queues that can facilitate file transfer prioritization during replication, in accordance with an embodiment of this disclosure.

FIG. 7 illustrates another example system architecture 700 for utilizing multiple queues that can facilitate file transfer prioritization during replication, in accordance with an embodiment of this disclosure. System architecture 700 can comprise system architecture 600 of FIG. 6 after all files in high priority replication queue 616 have been transferred to destination computer 622.

System architecture 700 comprises file system 708 (which can be similar to file system 608), file transfer prioritization during replication component 712 (which can be similar to file transfer prioritization during replication component 612), normal priority replication queue 714 (which can be similar to normal priority replication queue 161414), high priority replication queue 716 (which can be similar to high priority replication queue 616), and destination computer 722 (which can be similar to destination computer 622). In turn, file transfer prioritization during replication component 712 comprises copy job component 718 and file transfer component 720 (which can be similar to copy job component 618 and file transfer component 620, respectively).

In system architecture 700, high priority replication queue 716 is empty, but normal priority replication queue 714 contains files. So, file transfer component 720 can transfer files from normal priority replication queue 714 to destination computer 722 because high priority replication queue 716 is empty.

Figure 8:
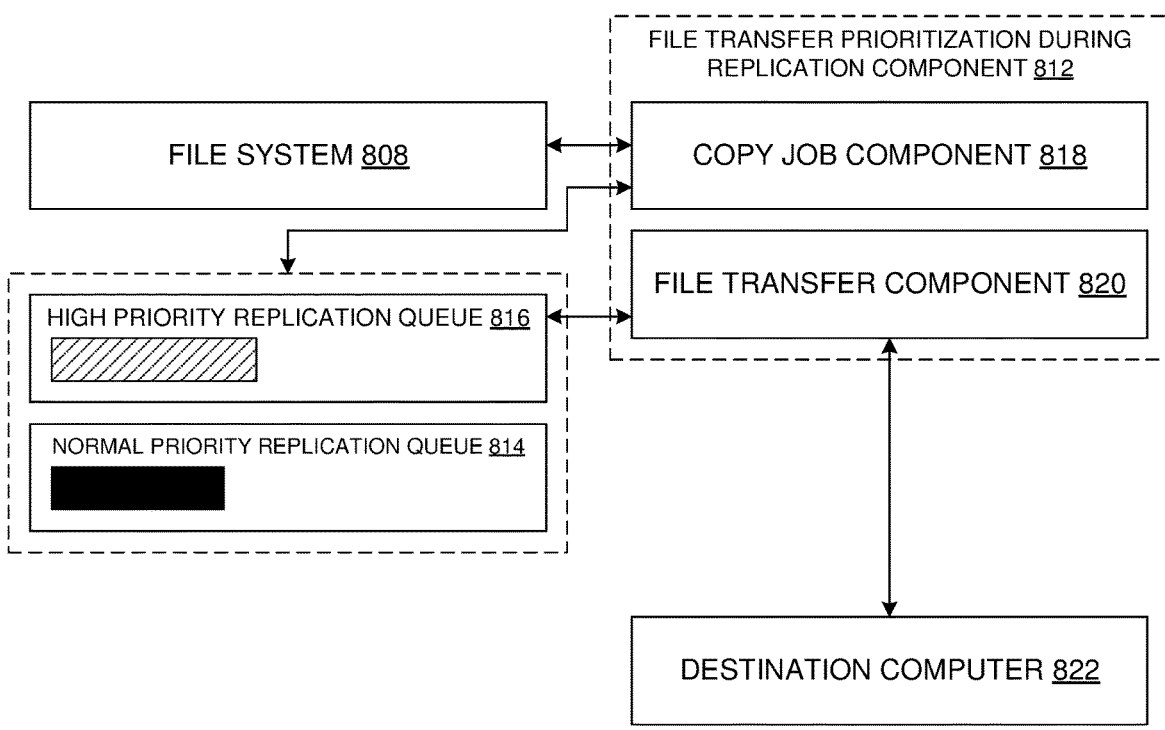
FIG. 8 illustrates another example system architecture for utilizing multiple queues that can facilitate file transfer prioritization during replication, in accordance with an embodiment of this disclosure.

FIG. 8 illustrates another example system architecture 800 for utilizing multiple queues that can facilitate file transfer prioritization during replication, in accordance with an embodiment of this disclosure. System architecture 800 can comprise system architecture 700 of FIG. 7 after some files have been added to high priority replication queue 716 (e.g., files that were not in high priority replication queue 616 of FIG. 6)

System architecture 800 comprises file system 808 (which can be similar to file system 708), file transfer prioritization during replication component 812 (which can be similar to file transfer prioritization during replication component 712), normal priority replication queue 814 (which can be similar to normal priority replication queue 161414), high priority replication queue 816 (which can be similar to high priority replication queue 716), and destination computer 822 (which can be similar to destination computer 722). In turn, file transfer prioritization during replication component 812 comprises copy job component 818 and file transfer component 820 (which can be similar to copy job component 718 and file transfer component 720, respectively).

In system architecture 800, high priority replication queue 816 has files. So, even though file transfer component 720 of FIG. 7 was transferring files from normal priority replication queue 714, and even though normal priority replication queue 814 contains files, file transfer component 820 switches to transferring files from high priority destination queue 816 and to destination computer 822.

Example Process Flows

FIG. 9 illustrates an example process flow 900 that can facilitate file transfer prioritization during replication, in accordance with an embodiment of this disclosure. In some examples, one or more embodiments of process flow 900 can be implemented by file transfer prioritization during replication component 112 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 1000 of FIG. 10, and/or process flow 1100 of FIG. 11.

Process flow 900 begins with 902, and moves to operation 904. Operation 904 depicts determining to perform a replication of data from first computing equipment to second computing equipment, wherein the data is stored within a path in a file system of the first computing equipment.

In some examples, operation 904 comprises receiving user input data indicative of identifying the priority user as having priority. That is, a user identity (e.g., an administrator account) can designate certain users as being priority users, and this information can be stored by file transfer prioritization during replication component 112 of FIG. 1 as part of facilitating file transfer prioritization during replication.

After operation 904, process flow 900 moves to operation 906.

Operation 906 depicts determining the path from a replication policy for the replication. This replication policy can be replication policy 110 of FIG. 1, which can define a path of system architecture 200 of FIG. 2 to be replicated.

After operation 906, process flow 900 moves to operation 908.

Operation 908 depicts, while tree-walking the path, in response to determining that a first file is marked for priority replication, adding the first file to a priority queue, and in response to determining that a second file lacks a marking for priority replication, adding the second file to a normal queue. This tree-walking can be performed in a similar manner as depicted with respect to system architecture 200 of FIG. 2. The priority queue can be high priority replication queue 116 of FIG. 1, and the normal queue can be normal priority replication queue 114.

In some examples, tree-walking the path comprises traversing a hierarchical structure of the path (e.g., system architecture 200 of FIG. 2) across each file of the path, and adding each file encountered while traversing the hierarchical structure of the path to the priority queue.

In some examples, operation 908 comprises marking the first file for priority replication in an extended attribute of the first file, in response to receiving user input data indicative of marking the first file. That is, specific files can be designated for priority replication, and an indication of this can be stored in an extended attribute of each such file (e.g., similar to system architecture 200 of FIG. 2).

In some examples, operation 908 comprises marking the first file for priority replication in an extended attribute of the first file, in response to determining that a priority user has performed an operation on the first file. That is, files that priority users access can be designated for priority replication, and an indication of this can be stored in an extended attribute of each such file (e.g., similar to system architecture 200 of FIG. 2).

In some examples, determining that the priority user has performed the operation on the first file comprises receiving an indication from a file system driver that implements the operation on the file system that the priority user has performed the operation on the first file. That is, a protocol driver for a file system (e.g., file system 118 of FIG. 1) can monitor file accesses by users, and set an extended attribute for a file that a priority user accesses.

In some examples, determining that the priority user has performed the operation on the first file comprises receiving an indication from a filter driver that that the priority user has performed the operation on the first file, wherein the filter driver monitors actions by a file system driver that implements the operation on the file system. That is, a filter driver (e.g., file transfer prioritization during replication filter driver 418 of FIG. 4) can monitor file accesses by users made through a corresponding protocol driver (e.g., protocol driver 416), and set an extended attribute for a file that a priority user accesses.

After operation 908, process flow 900 moves to operation 910.

Operation 910 depicts, in response to determining that the priority queue contains files, replicating the files from the priority queue instead of replicating other files from the normal queue. This can be performed in a similar manner as described with respect to FIGS. 6-8 where, for example, when both high priority replication queue 616 and normal priority replication queue 614 contain files, replication is made of the files in high priority replication queue 616 over the files in normal priority replication queue 614.

After operation 910, process flow 900 moves to 912, where process flow 900 ends.

FIG. 10 illustrates another example process flow 1000 that can facilitate file transfer prioritization during replication, in accordance with an embodiment of this disclosure. In some examples, one or more embodiments of process flow 1000 can be implemented by file transfer prioritization during replication component 112 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 900 of FIG. 9, and/or process flow 1100 of FIG. 11.

Process flow 1000 begins with 1002, and moves to operation 1004. Operation 1004 depicts determining, from a replication policy for a replication from a first device to a second device, a path of a file system of the first device to replicate. In some examples, operation 1004 can be implemented in a similar manner as operations 904-906 of FIG. 9.

After operation 1004, process flow 1000 moves to operation 1006.

Operation 1006 depicts, concurrently with tree-walking the path, in response to determining that a first file is marked for priority replication, adding, by the system, the first file to a replication queue for priority transfer, and in response to determining that a second file lacks a marking for priority replication, adding, by the system, the second file to the replication queue for normal transfer. In some examples, operation 1006 can be implemented in a similar manner as operation 908 of FIG. 9.

In some examples, operation 1006 comprises marking the first file for priority replication in response to receiving user input data indicative of marking the first file. That is, a user identity (e.g., an administrator account) can designate certain users as being priority users, and this information can be stored by file transfer prioritization during replication component 112 of FIG. 1 as part of facilitating file transfer prioritization during replication.

In some examples, operation 1006 comprises marking the first file for priority replication in response to determining that a priority user has performed an operation on the first file. That is, files that priority users access can be designated for priority replication, and an indication of this can be stored in an extended attribute of each such file (e.g., similar to system architecture 200 of FIG. 2).

In some examples, operation 1006 comprises marking the first file for priority replication in an extended attribute in metadata of the first file. This extended attribute can be similar to system architecture 300 of FIG. 3.

In some examples, determining that the first file is marked for priority replication comprises reading the extended attribute of the first file. That is, as a file system is tree walked (similar to system architecture 200 of FIG. 2), when a file is encountered, its corresponding extended attributes can be read to determine whether the file is marked for priority replication.

In some examples, the first file is contained within a sub-path of the path, and wherein the first file is determined to be marked for priority replication in response to determining that the sub-path is marked for priority replication. That is, in addition to files being marked for priority replication, directories can be marked for replication in their respective extended attributes. In such cases, files contained within that directory marked for priority replication can be replicated with priority.

After operation 1006, process flow 1000 moves to operation 1008.

Operation 1008 depicts, when the replication queue contains files noted for priority transfer, replicating, by the system, the files noted for priority transfer instead of replicating other files from the replication queue that are noted for normal transfer. In some examples, operation 1008 can be implemented in a similar manner as operation 910 of FIG. 9.

In some examples, operation 1008 comprises replicating files from the normal queue when the priority queue is empty. This can be performed similar to as depicted with respect to FIG. 7, where files from normal priority replication queue 714 are replicated when high priority replication queue 716 is empty.

After operation 1008, process flow 1000 moves to 1010, where process flow 1000 ends.

FIG. 11 illustrates another example process flow 1100 that can facilitate file transfer prioritization during replication, in accordance with an embodiment of this disclosure. In some examples, one or more embodiments of process flow 1100 can be implemented by file transfer prioritization during replication component 112 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 900 of FIG. 9, and/or process flow 1000 of FIG. 10.

Process flow 1100 begins with 1102, and moves to operation 1104. Operation 1104 depicts determining, from a replication policy for a replication from a first computer to a second computer, a path of a file system of the first computer to replicate. In some examples, operation 1004 can be implemented in a similar manner as operations 904-906 of FIG. 9.

After operation 1104, process flow 1100 moves to operation 1106.

Operation 1106 depicts, while analyzing files in the path, in response to determining that a first file is marked for priority replication, adding the first file to a priority queue, and in response to determining that a second file lacks a marking for priority replication, adding the second file to a normal queue. In some examples, operation 1006 can be implemented in a similar manner as operation 908 of FIG. 9.

In some examples, operation 1106 comprises marking the first file for priority replication in response to receiving user input data indicative of marking the first file. That is, a user identity (e.g., an administrator account) can designate certain users as being priority users, and this information can be stored by file transfer prioritization during replication component 112 of FIG. 1 as part of facilitating file transfer prioritization during replication.

In some examples, operation 1106 comprises marking the first file for priority replication in response to determining that a priority user has performed an operation on the first file. That is, files that priority users access can be designated for priority replication, and an indication of this can be stored in an extended attribute of each such file (e.g., similar to system architecture 200 of FIG. 2).

After operation 1106, process flow 1100 moves to operation 1108.

Operation 1108 depicts, based on the priority queue comprising files, replicating the files from the priority queue prior to replicating any files from the normal queue. In some examples, operation 1008 can be implemented in a similar manner as operation 910 of FIG. 9.

In some examples, operation 1108 comprises in response to determining that the priority queue is empty, replicating files from the normal queue. This can be performed similar to as depicted with respect to FIG. 7, where files from normal priority replication queue 714 are replicated when high priority replication queue 716 is empty.

In some examples, operation 1108 comprises, after beginning to replicate files from the normal queue, and in response to determining that there are again files in the priority queue, halting replicating files from the normal queue, and replicating files in the priority queue. This can be performed similar to as depicted with respect to FIG. 8, where replicating files from normal priority replication queue 814 is halted, and files from high priority replication queue 816 are replicated when high priority replication queue 816 is no longer empty.

In some examples, data is begun to be replicated from the priority queue or the normal queue before analyzing files in the path is completed. That is, data can be copied to a destination computer once there are entries in a replication queue, and before tree-walking a replication path has been completed.

After operation 1108, process flow 1100 moves to 1110, where process flow 1000 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of client computer 102 and/or server 106 of FIG. 1.

In some examples, computing environment 1200 can implement one or more embodiments of the process flows of FIGS. 8-10 to facilitate file transfer prioritization during replication.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   determining to perform a replication of data from first computing equipment to second computing equipment, wherein the data is stored within a path in a file system of the first computing equipment;
   determining the path from a replication policy for the replication;
   while tree-walking the path,
     in response to determining that a first file is marked for priority replication, adding the first file to a priority queue, and
     in response to determining that a second file lacks a marking for priority replication, adding the second file to a normal queue; and
   in response to determining that the priority queue contains files, replicating the files from the priority queue instead of replicating other files from the normal queue.

2. The system of claim 1, wherein the operations further comprise:
   marking the first file for priority replication in an extended attribute of the first file, in response to receiving user input data indicative of marking the first file.

3. The system of claim 1, wherein the operations further comprise:
   marking the first file for priority replication in an extended attribute of the first file, in response to determining that a priority user has performed an operation on the first file.

4. The system of claim 3, wherein determining that the priority user has performed the operation on the first file comprises:
   receiving an indication from a file system driver that implements the operation on the file system that the priority user has performed the operation on the first file.

5. The system of claim 3, wherein determining that the priority user has performed the operation on the first file comprises:
   receiving an indication from a filter driver that that the priority user has performed the operation on the first file, wherein the filter driver monitors actions by a file system driver that implements the operation on the file system.

6. The system of claim 3, wherein the operations further comprise:
   receiving user input data indicative of identifying the priority user as having priority.

7. The system of claim 1, wherein tree-walking the path comprises:
   traversing a hierarchical structure of the path across each file of the path; and
   adding each file encountered while traversing the hierarchical structure of the path to the priority queue.

8. A method, comprising:
   determining, by a system comprising a processor, and from a replication policy for a replication from a first device to a second device, a path of a file system of the first device to replicate;
   concurrently with tree-walking the path,
     in response to determining that a first file is marked for priority replication, adding, by the system, the first file to a replication queue for priority transfer, and
     in response to determining that a second file lacks a marking for priority replication, adding, by the system, the second file to the replication queue for normal transfer; and
   when the replication queue contains files noted for priority transfer, replicating, by the system, the files noted for priority transfer instead of replicating other files from the replication queue that are noted for normal transfer.

9. The method of claim 8, further comprising:
   marking, by the system, the first file for priority replication in response to receiving user input data indicative of marking the first file.

10. The method of claim 8, further comprising:
    marking, by the system, the first file for priority replication in response to determining that a priority user has performed an operation on the first file.

11. The method of claim 8, further comprising:
    marking, by the system, the first file for priority replication in an extended attribute in metadata of the first file.

12. The method of claim 11, wherein determining that the first file is marked for priority replication comprises:
    reading, by the system, the extended attribute of the first file.

13. The method of claim 8, wherein the first file is contained within a sub-path of the path, and wherein the first file is determined to be marked for priority replication in response to determining that the sub-path is marked for priority replication.

14. The method of claim 8, further comprising:
replicating, by the system, files from the replication queue that are noted for normal transfer when the replication queue lacks filed noted for priority transfer.

15. A non-transitory computer-readable medium comprising instructions that, in response to execution, cause a system comprising a processor to perform operations, comprising:
determining, from a replication policy for a replication from a first computer to a second computer, a path of a file system of the first computer to replicate;
while analyzing files in the path,
in response to determining that a first file is marked for priority replication, adding the first file to a priority queue, and
in response to determining that a second file lacks a marking for priority replication, adding the second file to a normal queue; and
based on the priority queue comprising files, replicating the files from the priority queue prior to replicating any files from the normal queue.

16. The non-transitory computer-readable medium of claim 15, wherein the operations further comprise:
marking the first file for priority replication in response to receiving user input data indicative of marking the first file.

17. The non-transitory computer-readable medium of claim 15, wherein the operations further comprise:
marking the first file for priority replication in response to determining that a priority user has performed an operation on the first file.

18. The non-transitory computer-readable medium of claim 15, wherein the operations further comprise:
in response to determining that the priority queue is empty, replicating files from the normal queue.

19. The non-transitory computer-readable medium of claim 18, wherein the operations further comprise:
after beginning to replicate files from the normal queue, and in response to determining that there are again files in the priority queue, halting replicating files from the normal queue, and replicating files in the priority queue.

20. The non-transitory computer-readable medium of claim 15, wherein data is begun to be replicated from the priority queue or the normal queue before analyzing files in the path is completed.

\* \* \* \* \*